United States Patent
Mistry

(10) Patent No.: US 6,381,529 B1
(45) Date of Patent: Apr. 30, 2002

(54) CONTROL SYSTEM FOR HYDROSTATIC TRANSMISSION

(75) Inventor: Sanjay Ishvarlal Mistry, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/876,332

(22) Filed: Jun. 7, 2001

(51) Int. Cl.⁷ .............................................. F16D 39/00
(52) U.S. Cl. .......................... 701/51; 60/492; 180/307
(58) Field of Search ............................. 701/51, 54, 67; 192/3.51, 215, 354; 180/337, 338, 307, 305; 91/473; 60/325, 492, 488, 327, 490

(56) References Cited

U.S. PATENT DOCUMENTS

| | | | | |
|---|---|---|---|---|
| 5,535,589 A | * | 7/1996 | Folsom | 60/492 |
| 5,540,048 A | * | 7/1996 | Larkin et al. | 60/492 |
| 5,575,152 A | * | 11/1996 | Folsom | 60/492 |
| 5,642,617 A | * | 7/1997 | Larkin et al. | 60/488 |
| 5,678,405 A | * | 10/1997 | Folsom | 60/488 |
| 6,085,521 A | * | 7/2000 | Folsom et al. | 60/490 |

* cited by examiner

Primary Examiner—Richard M. Camby

(57) ABSTRACT

A control system controls a hydrostatic transmission having an engine driven variable displacement pump coupled to a fixed displacement motor. The pump has a swashplate which is controlled by a control signal generated by the control system. The control system includes a speed command signal generator, a motor speed sensor for generating a sensed motor speed signal, an engine speed sensor for generating an engine speed signal, and a control unit which generates the control signal as a function thereof. The control unit generates a desired motor speed signal as a function of the speed command signal and the engine speed signal, generates a feed-forward command signal as a function of the desired motor speed signal, generates a difference signal as a difference between the desired motor speed signal and the sensed motor speed signal, generates an integral signal by applying an integral function to the difference signal, generating a sum signal as a summation of the feed-forward command signal and the integral signal, and generating the control signal as a function of the sum signal.

13 Claims, 5 Drawing Sheets else if ((abs(ΔS) > lo_error) && (abs(ΔS) <= hi_error))
    gain_ff = ((max_gff − min_gff)/(hi_error − lo_error))*abs(ΔS)
                − ((max_gff − min_gff)/(hi_error − lo_error))*lo_error
                + min_gff;

gain_p = ((max_gp − min_gp)/(hi_error − lo_error))*abs(ΔS)
                − ((max_gp − min_gp)/(hi_error − lo_error))*hi_error
                + max_gp;

gain_i = ((max_gi − min_gi)/(hi_error − lo_error))*abs(ΔS)
                − ((max_gi − min_gi)/(hi_error − lo_error))*hi_error
                + max_gi;

gain_d = ((max_gd − min_gd)/(hi_error − lo_error))*abs(ΔS)
                − ((max_gd − min_gd)/(hi_error − lo_error))*hi_error
                + max_gd;

*FIG. 4*

CONTROL SYSTEM FOR HYDROSTATIC TRANSMISSION

BACKGROUND OF THE INVENTION

The present invention relates to a control system for a hydrostatic transmission.

Infinitely variable transmissions (IVT) include a hydro module having an engine driven variable displacement pump, or variable unit, and a fixed displacement motor, or fixed unit. The variable unit includes a swashplate or yoke which is pivotal about a neutral position. The fixed displacement motor or fixed unit may be connected to vehicle drive wheels through a gear unit and a planetary module. In order to accurately control such an IVT, the position of the swashplate must be accurately controlled with respect to a speed command signal so that the IVT output speed closely matches the commanded speed. It is also desirable to have an IVT control system which operates so that the IVT output speed is equally accurate at slower speeds and at higher speeds, in both forward and reverse operation.

SUMMARY

Accordingly, an object of this invention is to provide a control system for an IVT which accurately controls the position of the swashplate with respect to a speed command signal.

A further object of the invention is to provide such an IVT control system which operates so that the IVT output speed closely matches the commanded speed.

A further object of the invention is to provide such an IVT control system which operates so that the IVT output speed is equally accurate at slower speeds and at higher speeds, in both forward and reverse operation.

These and other objects are achieved by the present invention, wherein the hydrostatic module is controlled by a control system which includes a closed loop control algorithm. The control system controls a hydrostatic transmission having an engine driven variable displacement pump coupled to a fixed displacement motor. The pump has a swashplate which is controlled by a control signal generated by the control system. The control system includes a speed command signal generator, a motor speed sensor for generating a sensed motor speed signal, an engine speed sensor for generating an engine speed signal, and a control unit which generates the control signal as a function thereof. The control unit generates a desired motor speed signal as a function of the speed command signal and the engine speed signal, generates a feed-forward command signal as a function of the desired motor speed signal, generates a difference signal as a difference between the desired motor speed signal and the sensed motor speed signal, generates an integral signal by applying an integral function to the difference signal, generating a sum signal as a summation of the feed-forward command signal and the integral signal, and generating the control signal as a function of the sum signal.

BRIEF DESCRIPTION OF THE DRAWINGS

FIG. 4 is pseudo code representation of a function performed by the control unit of the present invention.

DETAILED DESCRIPTION

Figure 1:
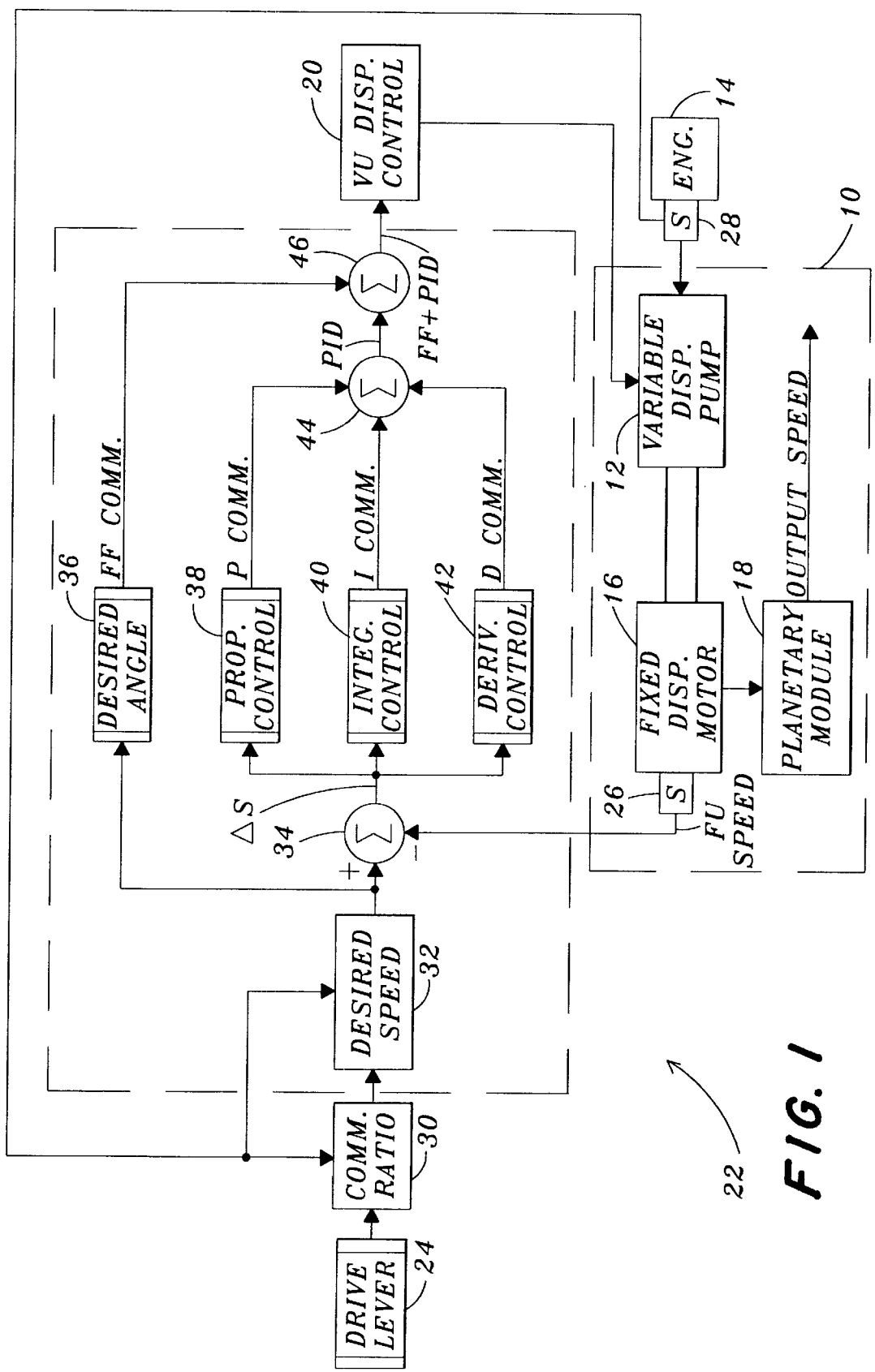
FIG. 1 is a schematic block diagram of a preferred embodiment of a control system for a hydrostatic transmission according to the present invention.
Figure 2:
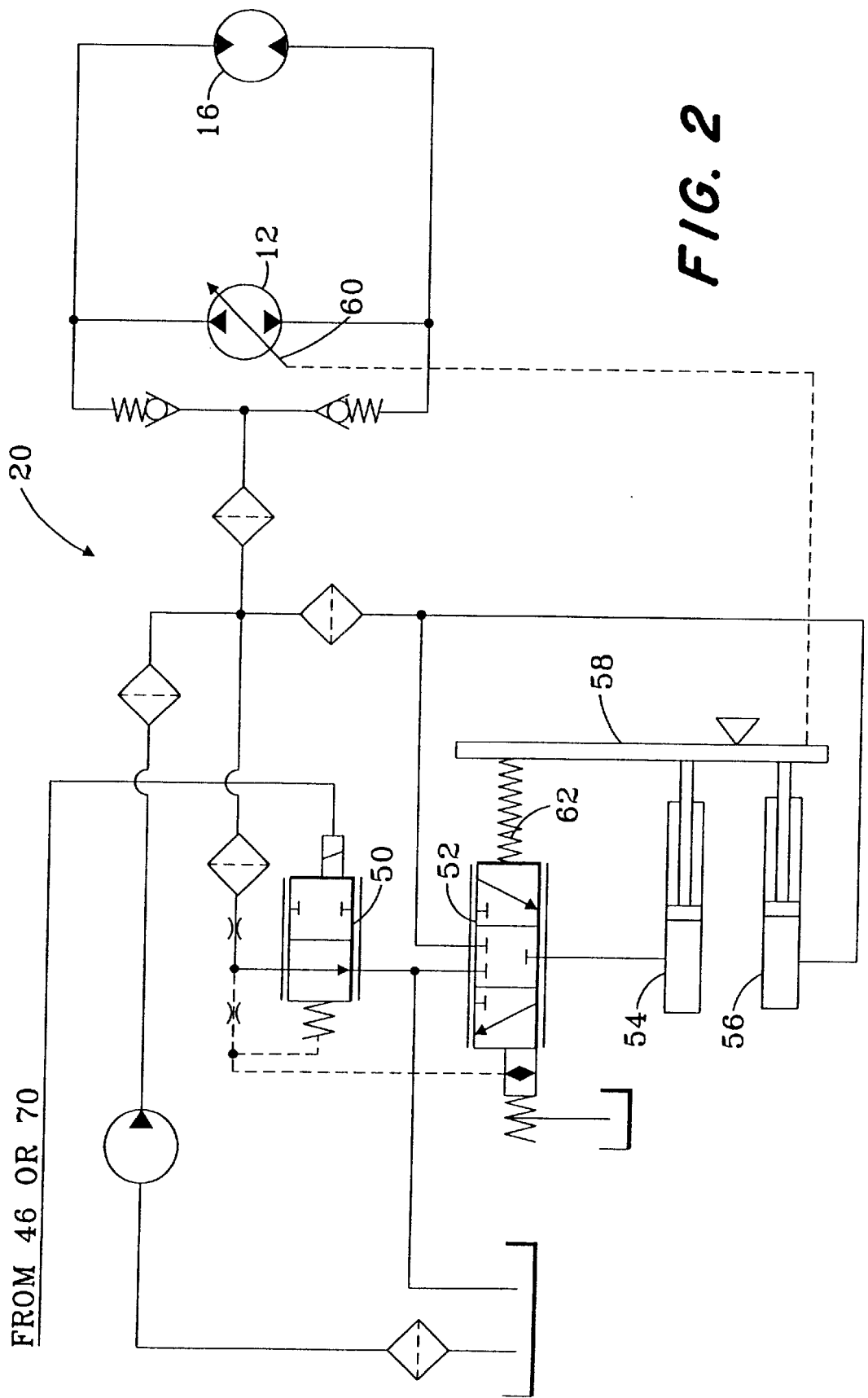
FIG. 2 is a schematic diagram of the displacement control unit of FIGS. 1 and 5.

Referring to FIGS. 1 and 2, a hydrostatic transmission module 10 includes a variable displacement pump or variable unit 12 which is driven by an engine 14 and which is coupled to a fixed displacement motor 16. An output of the motor 16 is coupled to vehicle drive wheels (not shown) via a planetary unit 18. The pump 12 has a yoke or swashplate (shown in FIG. 2) which is controlled by variable unit displacement control 20 which receives a control signal generated by control system 22.

The control system 22 includes a speed command or desired wheel speed signal generator 24 which is coupled to a shift or gear lever (not shown) which is movable to neutral, park, forward and reverse gear positions. A suitable speed command signal generator would be the shift lever/transducer assembly which is described in U.S. Pat. No. 5,406,860, issued Apr. 18, 1995 to Easton et al. The speed command signal represents a desired output speed of the transmission module 10 or speed of the wheels (not shown).

The control system 22 also includes a motor speed sensor 26 which generates a sensed motor speed signal representing the speed of motor 16 and an engine speed sensor 28 which generates a sensed engine speed signal representing the speed of engine 14. The control system 22 also includes a commanded ratio unit 30 which determines the operational mode of the transmission 10 as a function of the speed command signal and of the sensed engine speed signal. For example, the transmission 10 may have at least two forward modes for slower and faster speeds, and a reverse mode for a range of reverse speeds.

The control system 22 also includes a desired motor speed unit 32 which calculates a desired speed for the fixed unit 16 based on the engine speed, the commanded ratio and mode of transmission operation.

A difference unit 34 generates a difference signal or hydro speed error signal, ΔS, by subtracting the sensed motor speed signal from the desired motor speed signal.

A desired variable unit angle calculation unit 36 calculates desired variable unit angle based on the desired fixed unit speed, mode of transmission operation, and maximum and minimum variable unit angle limits in the particular transmission mode. This calculated desired variable unit angle is used as a feed-forward command.

A proportional unit 38 generates a proportional command signal, an integral unit 40 generates an integral signal, and a derivative unit 42 generates a derivative command signal, using known proportional-integral-derivative (PID) techniques and variable gain terms as described later. The outputs of units 38–42 are combined at summing unit 44 to produce a PID signal.

The PID signal is combined with the feed-forward command from unit 36 at summing unit 46 to produce a combined Feed-forward/PID signal which is supplied to displacement control unit 20.

Figure 5:
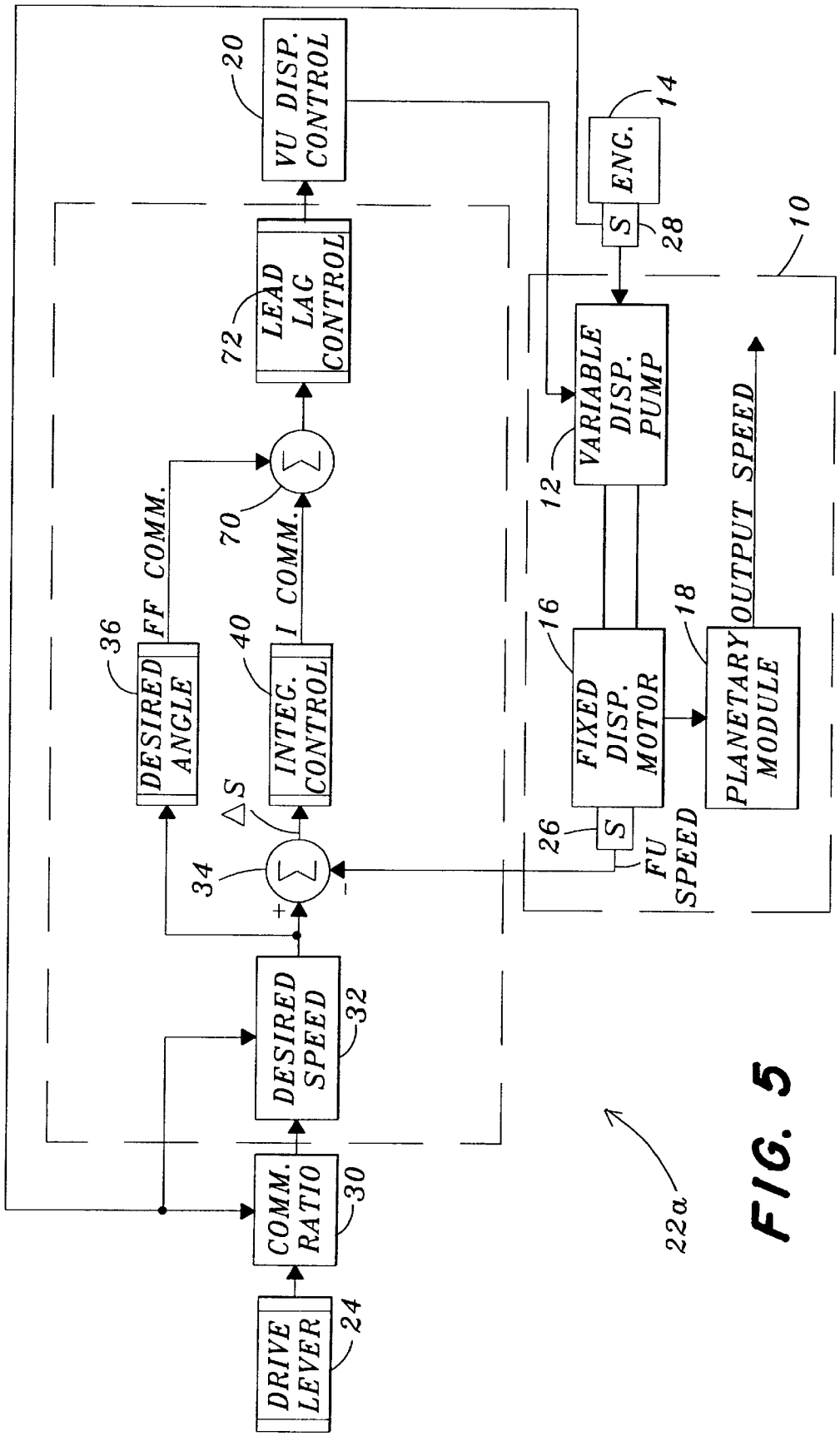
FIG. 5 is a schematic block diagram of an alternate embodiment of a control system for a hydrostatic transmission according to the present invention.

Referring to FIG. 2, the variable unit displacement control 20 includes a solenoid operated valve 50 which receives the output signal from summing unit 46 of FIG. 1 or from element 70 of FIG. 5. Valve 50 cooperates with displacement control spool valve 52 and a pair of servo pistons 54, 56, to control pivot member 58. Pivot member 58 is mechanically linked to control the position of the swashplate or yoke 60 of variable unit 12. A feedback spring 62 provides mechanical feedback between the pivot member 58 and valve 52. As a result, a force balance on the control valve 52 controls the angle of the swashplate 60 of the variable unit 12. One force is provided by hydraulic pressure controlled by valve 50. The other force is transmitted from pivot member 58 through feedback spring 62. Alternatively, displacement control 20 could be an electronic displacement control such as used on production John Deere 8000 T tractors.

Figure 3:
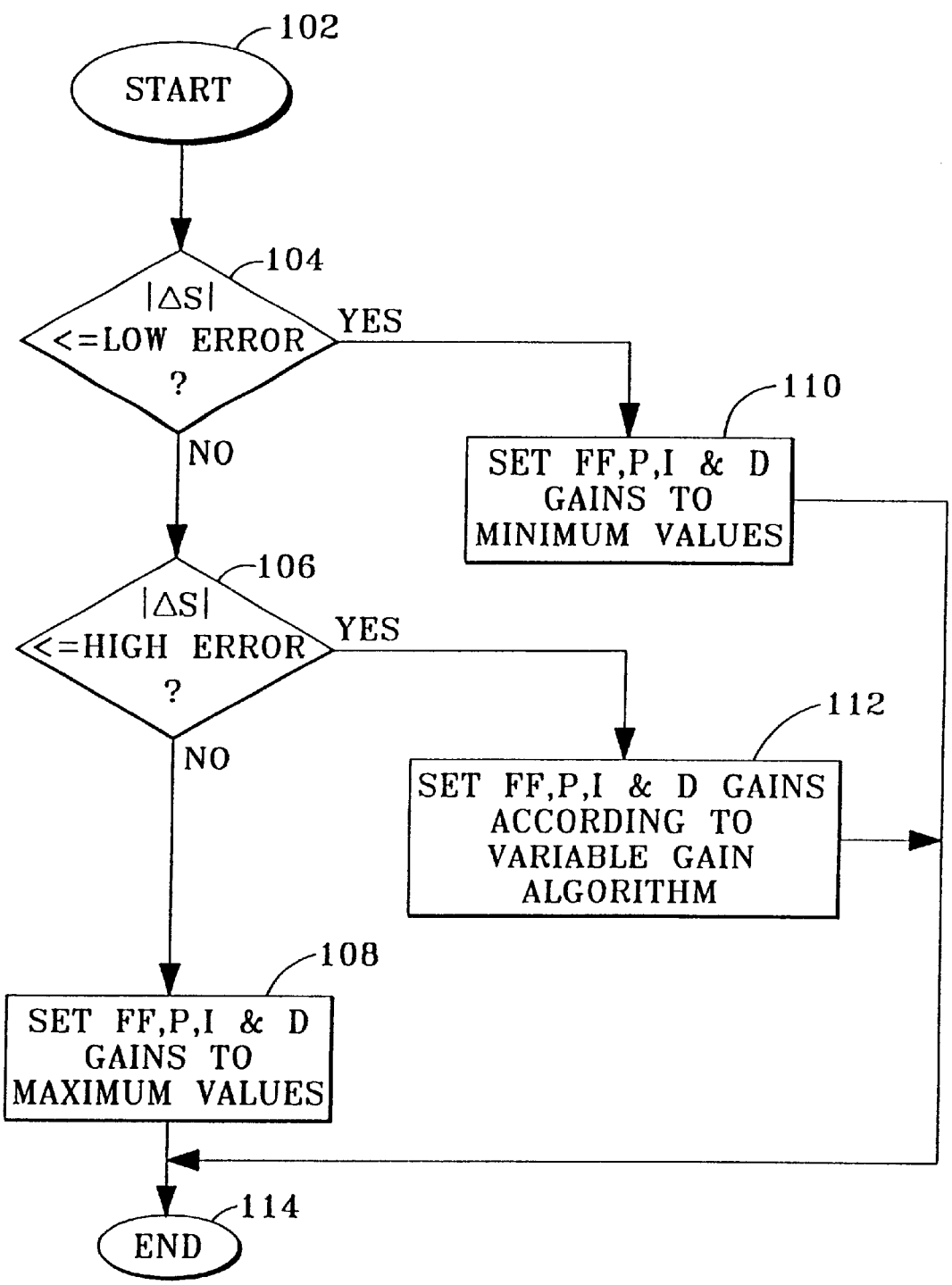
FIG. 3 is a logic flow diagram representing an algorithm executed by the control unit of the present invention.

As shown in FIGS. 3 and 4, the variable gain terms for functions 36, 38, 40 and 42 are determined. Referring to FIG. 3, the control system 22 executes an algorithm 100. After starting at step 102, step 104 compares ΔS to a low error threshold. If ΔS is less than or equal to this low threshold, step 110 sets the gains for functions 36, 38, 40 and 42 to minimum values and the algorithm ends at step 114. If ΔS is greater than this low threshold, the algorithm proceeds to step 106.

Step 106 compares ΔS to a high error threshold. If ΔS is less than or equal to this high threshold, step 112 sets the gains for blocks 36, 38, 40 and 42 according to a variable gain algorithm represented by the pseudo code listing set forth in FIG. 4. If ΔS is greater than this high threshold, the algorithm proceeds to step 108.

Step 108 sets the gains for blocks 36, 38, 40 and 42 to maximum values. The algorithm ends at step 114.

Referring now to FIG. 4, the variable gain algorithm represented thereby generates variable gain values for use by blocks 36–42 of FIG. 1, wherein ΔS is the hydro speed error, lo_err is a low threshold value for ΔS, hi_err is a high threshold value for ΔS, gain_ff is a feed-forward gain term, gain_p is a proportional gain term, gain_I is an integral gain term, gain_d is a derivative gain term, min_gff is a minimum value of gain_ff, max_gff is a maximum value of gain_ff, min_gp is a minimum value of gain_p, max_gp is a maximum value of gain_p, min_gi is a minimum value of gain_I, max_gi is a maximum value of gain_I, min_gd is a minimum value of gain_d, and max_gd is a maximum value of gain_d.

As a result of FIGS. 3 and 4, the gains for functions 36, 38, 40 and 42 are set to minimum values, to maximum values or to variable values, as a function of the speed error value ΔS and as a function of low and high threshold values.

Referring now to FIG. 5, the alternate control system 22A, is similar to the control system 22 of FIG. 1 with the following differences. In control system 22A the proportional and derivative units 38 and 42 are eliminated. The feed-forward command signal from unit 36 is combined with the integral signal from unit 40 at summing unit 70, and the output of summing unit 70 is supplied to a lead-lag compensator unit 72. The lead-lag unit 72 generates the control signal supplied to the displacement control 20, preferably using conventional pole placement methods.

The insertion of a lead compensator results in a small increase in gain and a large increase in the undamped natural frequency of a control system. The insertion of a lag compensator in cascade results in a large increase in gain and a small reduction in the undamped natural frequency. The lead-lag compensator unit 72 provides both advantages simultaneously. The large increase in gain improves the steady state response, while a large increase in the undamped natural frequency improves the transient response. Thus, the system response can be improved significantly by proper selection of lead and lag compensator components.

Thus, both systems 22 and 22A include a feed-forward signal generating unit and a integral unit. Both control systems 22 and 22A generate the control signal as a function of the speed command signal from 24, the sensed motor speed signal from sensor 26 and the engine speed signal from sensor 28.

Thus, the control system 22 operates to position the swashplate 60 of variable unit 12 at a given angle based on the control signal supplied to the displacement control 20. The output speed of the fixed unit 16 is therefore a function of variable unit input shaft speed, swashplate angle (displacement), loading, and the efficiencies of both the variable unit 12 and the fixed unit 16.

While the present invention has been described in conjunction with a specific embodiment, it is understood that many alternatives, modifications and variations will be apparent to those skilled in the art in light of the foregoing description. For example, the control system described herein could be implemented with a microprocessor-based control unit executing a computer program. The control system described herein could be in connection with a hydrostatic transmission which has two variable displacement pump/motor units instead of one variable displacement and one fixed displacement unit. The conversion of the above control systems into a computer program executed by a digital computer or microprocessor, will be evident to one with ordinary skill in the art. Accordingly, this invention is intended to embrace all such alternatives, modifications and variations which fall within the spirit and scope of the appended claims.

I claim:

1. A control system for controlling a hydrostatic transmission having an engine driven variable displacement pump coupled to a fixed displacement motor, the pump having a swashplate which is controlled by a control signal generated by the control system, the control system comprising:

a speed command signal generator;

a motor speed sensor for generating a sensed motor speed signal;

an engine speed sensor for generating an engine speed signal; and a control unit which generates the control signal as a function of the speed command signal, the sensed motor speed signal and the engine speed signal, the control unit generating a desired motor speed signal as a function of the speed command signal and the engine speed signal, generating a desired swashplate angle signal as a function of the desired motor speed signal, generating a difference signal as a difference between the desired motor speed signal and the sensed motor speed signal, generating an integral signal by applying an integral function to the difference signal, generating a sum signal as a summation of the desired swashplate angle signal and the integral signal, and generating the control signal as a function of the sum signal.

2. The control system of claim 1, wherein:

the desired swashplate angle signal represents a desired position of the swashplate of the pump.

3. The control system of claim 1, wherein:

the control unit generates a proportional signal by applying a proportional function to the difference signal, generates a derivative signal by applying a derivative signal to the difference signal, and the control unit generates the sum signal as a summation of the desired swashplate angle signal, the proportional signal, the integral signal and the derivative signal.

4. The control system of claim 3, wherein:

the control unit generates a commanded ratio signal as a function of the speed command signal and the engine speed signal, and generates the desired motor speed signal as a function of the commanded ratio signal and the engine speed signal.

5. The control system of claim 1, wherein:

the control unit generates a commanded ratio signal as a function of the speed command signal and the engine speed signal, and generates the desired motor speed signal as a function of the commanded ratio signal and the engine speed signal.

6. The control system of claim 1, wherein:

the integral function includes a variable gain value; and the control unit determines the variable gain value as a function of the difference signal and threshold values.

7. The control system of claim 6, wherein:

the variable gain value is set to a minimum value if the difference signal is less than or equal to a low threshold value; and the variable gain value is set to a maximum value if the difference signal is greater than a high threshold value.

8. The control system of claim 6, wherein:

the variable gain value is set to a variable value if the difference signal is greater than a low threshold value and less than a high threshold value.

9. A control system for controlling a hydrostatic transmission having an engine driven variable displacement pump coupled to a fixed displacement motor, the pump having a swashplate which is controlled by a control signal generated by the control system, the control system comprising:

a speed command signal generator;

a motor speed sensor for generating a sensed motor speed signal:

an engine speed sensor for generating an engine speed signal; and a control unit which generates the control signal as a function of the speed command signal, the sensed motor speed signal and the engine speed signal, the control unit generating a desired motor speed signal as a function of the speed command signal and the engine speed signal, generating a desired swashplate angle signal as a function of the desired motor speed signal, generating a difference signal as a difference between the desired motor speed signal and the sensed motor speed signal, generating a proportional signal by applying a proportional function to the difference signal, generating an integral signal by applying an integral function to the difference signal, generating a derivative signal by applying a derivative function to the difference signal, generating a sum signal as a summation of the desired swashplate angle signal, the proportional signal, the integral signal and the derivative signal, and generating the control signal as a function of the sum signal.

10. A control system for controlling a hydrostatic transmission having an engine driven variable displacement pump coupled to a fixed displacement motor, the pump having a swashplate which is controlled by a control signal generated by the control system, the control system comprising:

a speed command signal generator;

a motor speed sensor for generating a sensed motor speed signal;

an engine speed sensor for generating an engine speed signal; and a control unit which generates the control signal as a function of the speed command signal, the sensed motor speed signal and the engine speed signal, the control unit generating a desired motor speed signal as a function of the speed command signal and the engine speed signal, generating a desired swashplate angle signal as a function of the desired motor speed signal, generating a difference signal as a difference between the desired motor speed signal and the sensed motor speed signal, generating an integral signal by applying an integral function to the difference signal, generating a sum signal as a summation of the desired swashplate angle signal and the integral signal, and generating the control signal by applying a lead-lag function to the sum signal.

11. The control system of claim 10, wherein:

the integral function includes a variable gain value; and the control unit determines the variable gain value as a function of the difference signal and threshold values.

12. The control system of claim 11, wherein:

the variable gain value is set to a minimum value if the difference signal is less than or equal to a low threshold value; and the variable value is set to a maximum value if the difference signal is greater than a high threshold value.

13. The control system of claim 11, wherein:

the variable gain value is set to variable value if the difference signal is greater than a low threshold value and less than a high threshold value.

* * * * *